(12) United States Patent
Whitmer

(10) Patent No.: US 7,908,069 B2
(45) Date of Patent: Mar. 15, 2011

(54) METHOD OF OPERATING A CLUTCH DURING A VEHICLE LAUNCH

(75) Inventor: Jeremy Whitmer, Columbus, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 548 days.

(21) Appl. No.: 12/001,391

(22) Filed: Dec. 11, 2007

(65) Prior Publication Data

US 2008/0154469 A1    Jun. 26, 2008

Related U.S. Application Data

(60) Provisional application No. 60/876,650, filed on Dec. 22, 2006.

(51) Int. Cl.
*G06F 17/00* (2006.01)
(52) U.S. Cl. ............ 701/60; 701/1; 701/51; 701/58; 701/67; 701/70; 477/45; 477/46; 477/92; 477/175; 477/181
(58) Field of Classification Search .......... 701/60
See application file for complete search history.

(56) References Cited

U.S. PATENT DOCUMENTS

| | | | | |
|---|---|---|---|---|
| 4,967,884 A * | 11/1990 | Norcia | ...... | 192/13 A |
| 5,180,339 A * | 1/1993 | Haley et al. | ...... | 474/28 |
| 5,269,726 A * | 12/1993 | Swanson et al. | ...... | 474/28 |
| 6,007,452 A * | 12/1999 | Sawada et al. | ...... | 477/45 |
| 6,030,313 A * | 2/2000 | Sawada et al. | ...... | 477/46 |
| 6,216,081 B1 * | 4/2001 | Tabata et al. | ...... | 701/87 |
| 6,517,465 B2 * | 2/2003 | Hrazdera | ...... | 477/174 |
| 6,641,498 B2 * | 11/2003 | Okuwaki | ...... | 475/117 |
| 7,134,538 B2 * | 11/2006 | Hasegawa et al. | ...... | 192/220.1 |
| 7,146,262 B2 * | 12/2006 | Matsubara et al. | ...... | 701/51 |
| 7,359,784 B2 * | 4/2008 | Murasugi et al. | ...... | 701/51 |
| 7,575,111 B2 * | 8/2009 | Ogata et al. | ...... | 192/3.3 |
| 2004/0204290 A1 * | 10/2004 | Ito | ...... | 477/175 |
| 2004/0226795 A1 * | 11/2004 | Morise et al. | ...... | 192/3.29 |
| 2004/0231951 A1 * | 11/2004 | Hasegawa et al. | ...... | 192/220 |
| 2004/0249542 A1 * | 12/2004 | Murasugi et al. | ...... | 701/51 |
| 2005/0020403 A1 * | 1/2005 | Hasegawa et al. | ...... | 477/92 |
| 2005/0027424 A1 * | 2/2005 | Matsubara et al. | ...... | 701/51 |
| 2007/0142174 A1 * | 6/2007 | Swank et al. | ...... | 477/181 |
| 2010/0174465 A1 * | 7/2010 | Gibson et al. | ...... | 701/70 |

* cited by examiner

*Primary Examiner* — Khoi Tran
*Assistant Examiner* — Jonathan L Sample
(74) *Attorney, Agent, or Firm* — Simpson & Simpson, PLLC

(57) ABSTRACT

A method of operating a clutch during vehicle launch including increasing a first hydraulic pressure in an inner chamber from a first to a second level; decreasing a second hydraulic pressure in an outer chamber from a third to a fourth level in response to engine speed and throttle position for the vehicle; and slipping the clutch in response to increasing and decreasing the first and second pressures, respectively. The first hydraulic pressure urges a clutch disposed between the engine and an impeller for a vehicle torque converter to an engaged position. The second hydraulic pressure opposes the first hydraulic pressure. In some aspects, the method includes determining a temperature for oil in a transmission in the vehicle. Then, decreasing the second hydraulic pressure includes decreasing the second pressure in response to the determined temperature. In some aspects, the clutch and the chambers are located in the torque converter.

19 Claims, 3 Drawing Sheets

METHOD OF OPERATING A CLUTCH DURING A VEHICLE LAUNCH

CROSS-REFERENCE TO RELATED APPLICATIONS

This application claims the benefit under 35 U.S.C. §119 (e) of U.S. Provisional Application No. 60/876,650 filed on Dec. 22, 2006 which application is incorporated herein by reference.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a method of controlling a clutch located between an engine and an impeller for a torque converter to enable turbo charge spool up during a vehicle launch event.

BACKGROUND OF THE INVENTION

Turbochargers are used in vehicle engines to increase the power output of the engine without increasing the size of the engine, specifically, the cylinder displacement. That is, a turbocharger can significantly improve the power-to-weight ratio for the engine. A turbocharger uses the exhaust flow from the engine to spin a turbine, which in turn spins an air pump. The turbine in the turbocharger spins at speeds of up to 150,000 rotations per minute. Power increases of 30 to 40 percent are typical for turbocharged engines.

Unfortunately, turbochargers do not provide an immediate power boost during a launch event. A time period, typically measured in seconds or fractions of seconds is needed for the turbine to reach the speeds necessary to produce the desired boost. This phenomenon, known as "turbo-lag," results in a hesitation at the start of a launch event. It is known to decrease turbo-lag by reducing the inertia of the rotating parts in the turbocharger, mainly by reducing the weight of the parts. This weight reduction enables the turbine and compressor to accelerate more quickly, and start providing boost earlier. Inertia can be reduced by reducing the size of the turbocharger. Unfortunately, a smaller turbocharger may not be able to provide adequate boost at higher engine speeds. Also, a smaller turbocharger may rotate at excessive speeds.

For turbocharged engines in vehicles with torque converters, it is known to use a "loose" torque converter. This arrangement allows the engine to attain higher speeds during the launch event, decreasing the time necessary for the turbocharger to reach the desired speed. Unfortunately, this configuration results in a decrease in fuel economy across the entire operating range of the torque converter.

Thus, there is a long-felt need for a means to reduce turbo-lag without compromising fuel economy or the performance of the turbocharger.

BRIEF SUMMARY OF THE INVENTION

The present invention broadly comprises a method of operating a clutch during a vehicle launch including the steps of increasing a first hydraulic pressure in an inner chamber from a first level to a second level, and decreasing a second hydraulic pressure in an outer chamber from a third level to a fourth level as a function of a speed for the engine. The first hydraulic pressure urges, to an engaged position, a clutch disposed between an engine in the vehicle and an impeller for a torque converter in the vehicle and the second hydraulic pressure opposes the first hydraulic pressure. In some aspects, the method includes decreasing the second hydraulic pressure in the outer chamber as a function of a throttle position for the engine. The method slips the clutch in response to decreasing the second pressure.

In some aspects, decreasing the second hydraulic pressure includes decreasing the second pressure as a function of oil temperature in the transmission. In some aspects, the first level is equal to a maximum operating pressure for the outer chamber, is at least 50% greater than the third pressure, is at least twice the third pressure, or is at least triple the third pressure. In some aspects, the method compares the function of the engine speed with a threshold value and maintains the first pressure at the first level if the function is greater than the threshold value. In some aspects, the method compares the function of the engine speed with a threshold value and increases the first pressure to the second level if the function is less than or equal to the threshold value. In some aspects, the method compares the engine speed to a launch threshold value and if the engine speed is greater than the launch threshold value bypasses the function of engine speed to decrease the third level to the fourth level.

In some aspects, the vehicle comprises a valve controlling hydraulic pressure in the outer chamber and a zero percent duty cycle fully opens the valve. The method includes comparing the engine speed to a launch threshold value and, when the engine speed is greater than the launch threshold value, applying the zero percent duty cycle to the valve. In some aspects, the vehicle comprises a valve controlling hydraulic pressure in the outer chamber and a duty cycle controls an operating position for the valve. Then the method includes comparing the engine speed to a launch threshold value and, when the engine speed is less than or equal to the launch threshold value, determining the duty cycle as a function of the engine speed and applying the duty cycle to the valve. In some aspects, the method modifies the duty cycle as a function of oil temperature in the transmission.

In some aspects, the clutch and the first and second chambers are disposed in the torque converter. In some aspects, the torque converter comprises a cover, an output hub, and a torque converter clutch, and the torque converter clutch provides a torque transmission path between the cover and the output hub. In some aspects, the method maintains the engine speed below a predetermined level. In some aspects, the method determines an optimal engine speed to provide a peak torque for a determined throttle position and fully engages the clutch when the engine reaches the optimal engine speed.

It is a general object of the present invention to provide a method of controlling a clutch during a vehicle launch that enables an increase in engine speed, turbo spool up, and available engine torque during the launch event.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
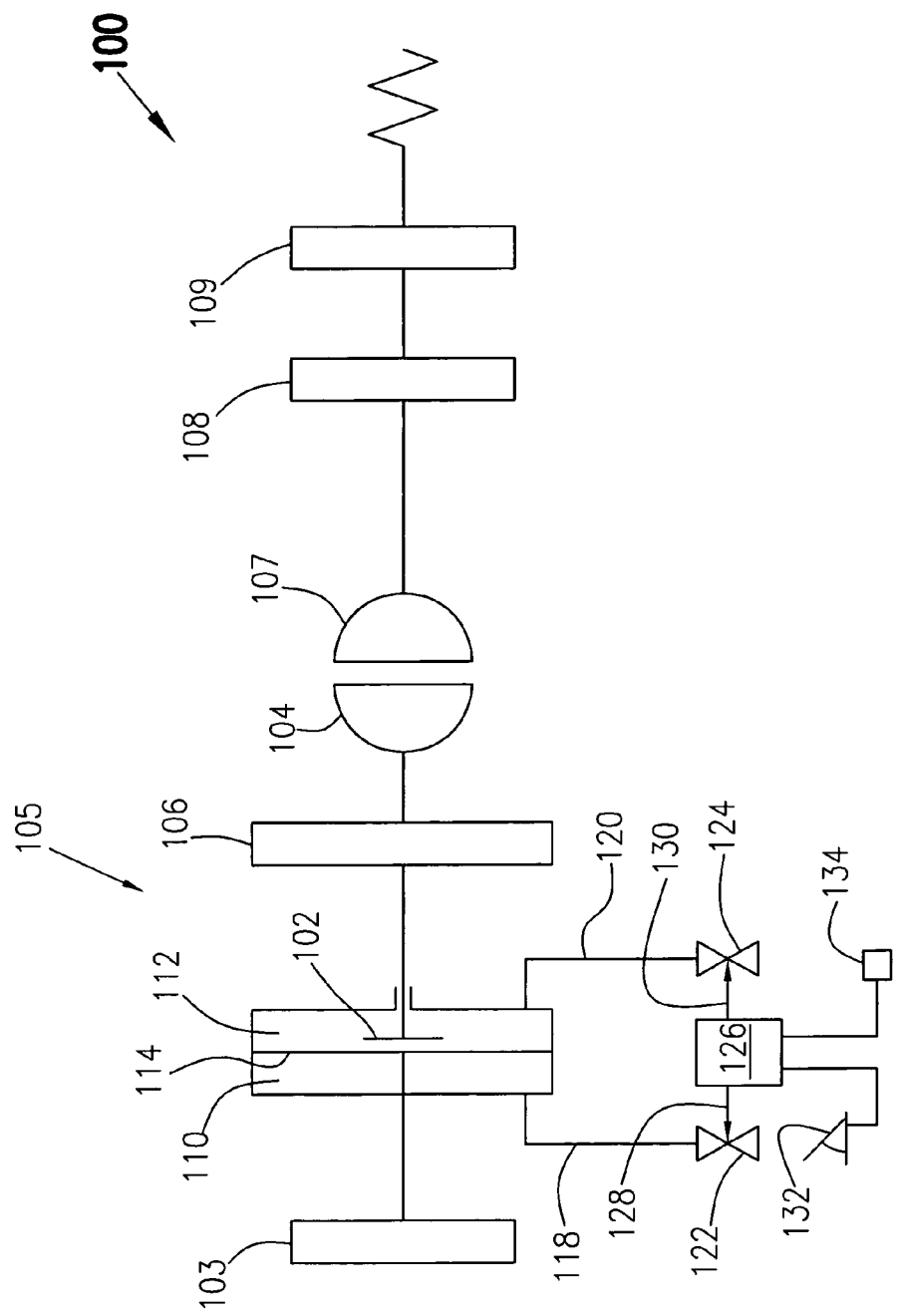
FIG. 1 is a schematic diagram of a clutch system for use with a present invention method of operating a torque converter during vehicle launch.

FIG. 1 is a schematic diagram of clutch system 100 for use with present a invention method of operating a torque converter during vehicle launch. System 100 includes impeller clutch, or disconnect clutch 102 between engine 103 for a vehicle (not shown) and impeller 104 for torque converter 105. Clutch 102 is connected to pump cover 106. Impeller 104 is fluidly coupled to turbine 107, which is connected to turbine shell 108. Shell 108 is connected to output hub 109. Typically the impeller clutch is operated by manipulating respective hydraulic pressures in two chambers. To engage the impeller clutch, pressure in one chamber is increased and pressure in the other chamber is decreased. For example, pressure in inner chamber 110 is increased and pressure in outer chamber 112 is decreased. That is, there is a positive pressure differential across the clutch between the inner and outer chambers.

In some aspects, clutch 102 includes piston plate 114, which hydraulically separates the chambers. The plate is displaceable in response to pressures in the chambers. For example, increasing pressure in the inner chamber and decreasing pressure in the outer chamber cause the plate to move such that the clutch engages. It should be understood that the configuration shown in FIG. 1 is for purposes illustration only and that a clutch system for use with a present invention method is not limited to the configuration shown. For example, any impeller clutch known in the art and using two chambers can be used with a present invention method.

The torque capacity of the impeller clutch depends on the pressure differential between the inner and outer chambers. As the differential increases, the torque capacity also increases. The impeller clutch slips if the torque applied to the clutch is greater than the torque capacity associated with the pressure differential for the clutch at the time the torque is applied.

The inner chamber is connected to inner pressure line 118 to supply fluid to the chamber and the outer chamber is connected to outer pressure line 120 to enable discharge of fluid from the chamber. In some aspects, valve 122 and valve 124 are placed in the inner and outer lines, respectively, to control fluid flow through the lines. In some aspects, the valves are solenoid valves. The inner and outer valves are used to control pressure in the respective chambers, and hence, the differential pressure across plate 114.

Valves 122 and 124 can be controlled by any means known in the art. In some aspects, system 100 includes controller 126, used to send pulse width modulation (PWM) signals 128 and 130, respectively, to valves 122 and 124, for the control of the valves, as described infra.

Clutch 102 is modulated (allowed to slip) during a launch event for the vehicle such that the engine speed is greater than the rotational speed of impeller 104. That is, the slippage of the clutch enables the engine to rotate faster than the impeller. In accordance with a present invention method, the clutch is closed at an appropriate point in time to synchronize the rotation of the engine and impeller. During the entire launch sequence, torque is transmitted through clutch 102 to eliminate a delay between the launch time expected by a driver of the vehicle and the actual vehicle launch. The constant transfer of torque also eliminates shock that could occur from engaging the clutch when there is a large amount of torque produced by the engine and the difference of rotational speed between the engine and the torque converter is relatively great.

Pressure in chambers 110 and 112 are controlled as functions of the engine speed or as functions of the engine speed and a position for accelerator pedal 132 or a throttle (not shown). In some aspects, an open loop control scheme is used in which the respective values of the PWM signals are determined based upon engine speed. That is, the signals are a function of the engine speed. In some aspects, the signals also are a function of the position of pedal 132 or the throttle. In some aspects, the controller derives a correction value for the control signals to account for the viscosity changes in transmission fluid due to temperature changes in the transmission. Any means known in the art can be used to determine the fluid temperature, for example, sensor 134. The control signals designate duty cycles for the respective valves. For example, a 100% duty cycle fully closes the valve and a 0% duty cycle fully opens the valve. In some aspects, controller 126 includes respective look-up tables (not shown) to derive signals 128 and 130. The tables provide a matrix with throttle position and engine speed as the row and column parameters.

Figure 2:
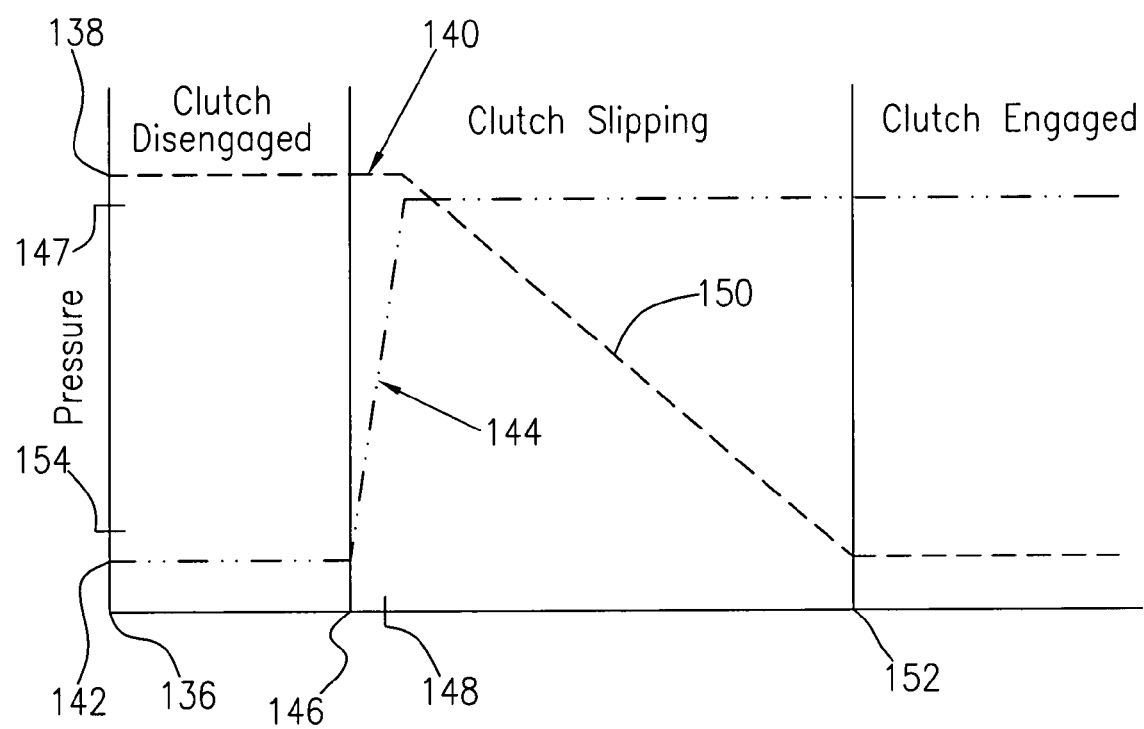
FIG. 2 is a graph showing control of hydraulic pressure in outer and inner chambers according to a present invention method of operating a torque converter during vehicle launch; and, FIG. 3 is a flow chart of a present invention method.

FIG. 2 is a graph showing control of hydraulic pressure in outer and inner chambers according to a present invention method of operating a torque converter during vehicle launch. At beginning 136 of a launch event, the clutch is disengaged, level 138 for pressure 140 in the outer chamber is relatively high and level 142 for pressure 144 in the inner chamber is relatively low. In some aspects, pressure 140 is 50% higher than pressure 144, double pressure 144, or triple pressure 144. In some aspects, the pressure in the outer chamber is at or near the maximum operating pressure for the chamber and the pressure in the inner chamber is at or near the minimum operating pressure for the chamber.

At point 146, the launch event begins. In some aspects, pressure 144 is quickly raised to level 147 and is maintained at this level. Level 147 is the maximum engagement pressure that is applied to plate 114. At point 148, the inner chamber is applying maximum pressure to engage the clutch, but the outer chamber is still applying maximum pressure to oppose the engagement of the clutch. Therefore, there is relatively little apply pressure on the clutch and the clutch slipping is at a maximum.

At point 148, the engine speed, throttle position, and oil temperature are used to generate signal 130 which causes valve 124 to open and pressure 140 to drop. The slope of segment 150 depends on the engine speed, throttle position, and oil temperature. In general, the higher the engine speed and throttle position, the steeper the ramp. During segment 150, clutch 102 continues to slip, but the amount of slippage decreases as pressure 140 decreases.

At point 152, pressure 140 reaches minimum level 154 and clutch 102 is fully engaged. That is, clutch 102 ceases to slip. It should be understood that clutch 102 may stop slipping at some other point closer to point 148. At point 152, pressures 140 and 144 are determined such that clutch 102 has a desire torque capacity.

In some aspects (not shown), at point 136, pressure 140 is quickly decreased and pressure 144 is slowly increased in response to signal 128. That is, the manipulation of the pressures is the reverse of that shown in FIG. 2.

FIGS. 1 and 2 are with respect to a launch event for a diesel engine equipped with a turbocharger. However, it should be understood that the present invention is not limited to diesel engines and that the use of the present invention with other types of turbocharged engines is included in the spirit and scope of the invention as claimed. By launch event we mean putting in motion a vehicle fully or substantially at rest or putting in forward motion a vehicle on an upwardly slanted slope (from back to front of the vehicle) and experiencing a force in the reverse direction.

In some aspects, a multi-function torque converter (MFTC) is used with the present invention method. An MFTC is described in U.S. Pat. No. 6,494,303, "TORSIONAL VIBRATION DAMPER FOR A TORQUE TRANSMITTING APPARATUS," issued Dec. 17, 2002 and incorporated herein by reference. However, it should be understood that the present invention method can be applied to any MFTC known in the art or to any torque converter employing a clutch between the torsional input to the converter and a pump for the converter and that such application is included in the spirit and scope of the invention as claimed.

Figure 3:
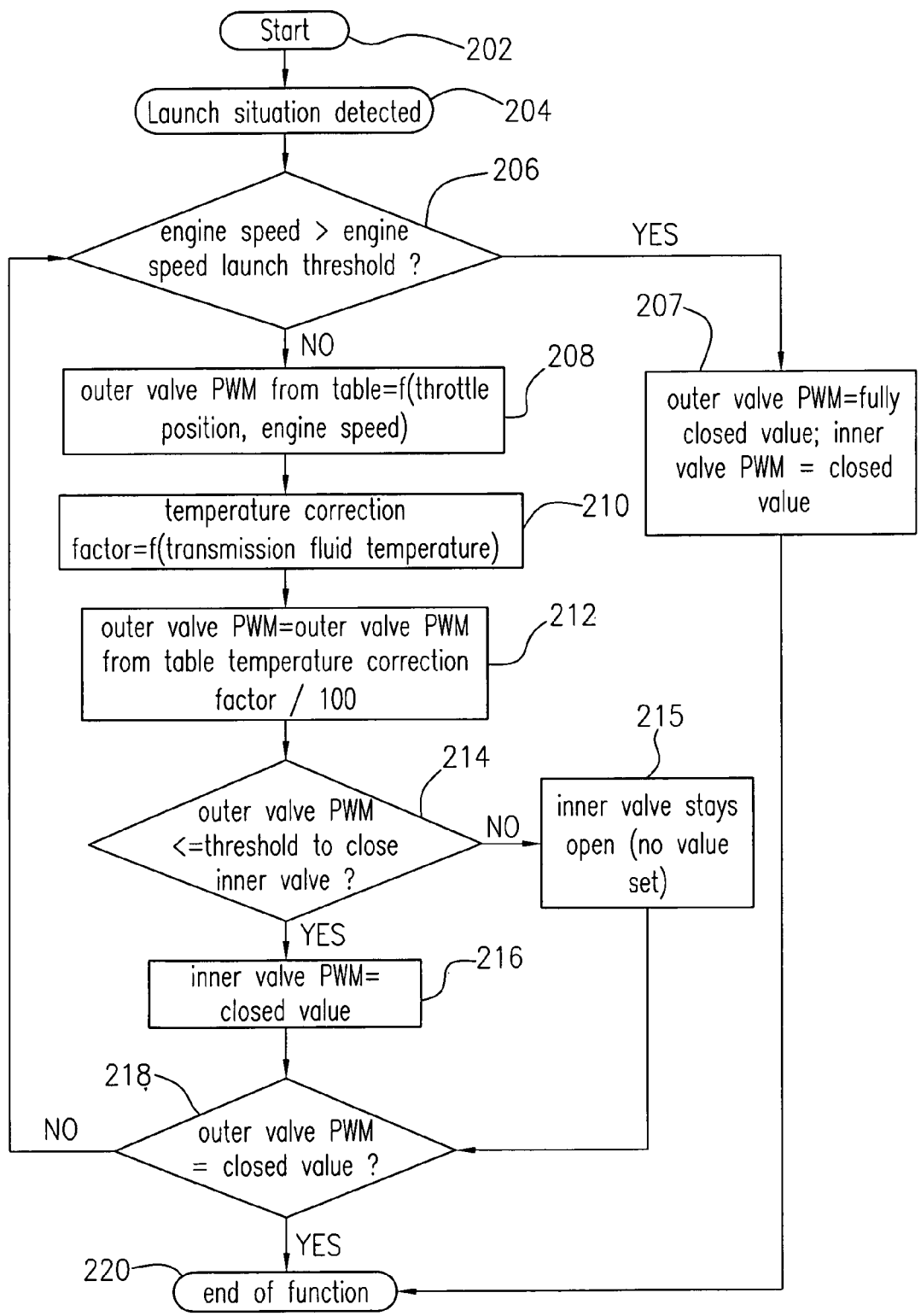

FIG. 3 is a flow chart of present invention method 200. Although method 200 in FIG. 3 is depicted as a sequence of numbered steps for clarity, no order should be inferred from the numbering unless explicitly stated. The steps are referenced with respect to system 100, however, it should be understood that method 200 is not limited to use with system 100 and that method 200 is applicable to any system with an impeller clutch. The method starts at step 202. Step 204 detects a launch situation. Step 206 compares the engine speed to a threshold value. If the speed is greater than the threshold value, step 207 sets control signals 128 and 130 so that valves 122 and 124 are unenergized, which places torque converter 105 in torque converter mode and bypasses the remainder of the method. That is, chamber 110 is rapidly charged (similar to what is shown in FIG. 2) and chamber 112 is rapidly exhausted. In general, the rate of discharge for chamber 112 is more rapid than would be the case if the pressure in the chamber were reduced as a function of the engine speed. Then the method proceeds to step 220, the end of the method.

If step 206 determines that the engine speed is less or equal to the threshold, step 208 generates signal 130 as a function of engine speed and throttle position. Step 210 determines a transmission oil temperature factor as a function of the oil temperature and step 212 modifies signal 130 using the oil temperature factor. Then step 214 compares signal 130 to a threshold regarding valve 122. If the signal is above the threshold, which corresponds to the pressure in chamber 112 being above a certain level, step 215 keeps valve 122 closed and chamber 110 is not charged. The method then proceeds to step 218. That is, unlike the scheme described in FIG. 2, the method does not automatically "flip" the pressure in chamber 110 when a launch situation is detected. If signal 130 is less than or equal to the threshold, step 216 opens valve 122 to charge chamber 110 and then the method proceeds to step 218.

Step 218 compares the signal for valve 124 to a final or fully open value. If the valve is not yet fully opened, the method returns to step 206. If the valve is fully opened, the clutch is fully engaged and the method terminates.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

I claim:

1. A method of operating a clutch in a torque converter in a vehicle during a launch of the vehicle comprising the steps of:
increasing a first hydraulic pressure in an inner chamber of the torque converter from a first level to a second level, wherein said first hydraulic pressure urges, to an engaged position, a clutch disposed in the torque converter between an engine in said vehicle and an impeller for the torque converter such that the clutch is engaged with a pump cover for the torque converter and the impeller; and,
decreasing a second hydraulic pressure in an outer chamber of the torque converter from a third level to a fourth level as a function of a speed for said engine, wherein said second hydraulic pressure opposes said first hydraulic pressure.

2. The method of claim 1 further comprising decreasing said second hydraulic pressure in said outer chamber as a function of a throttle position for said engine.

3. The method of claim 1 further comprising slipping said clutch in response to decreasing said second pressure.

4. The method of claim 1 wherein said vehicle comprises a transmission and decreasing said second hydraulic pressure further comprises decreasing said second pressure as a function of oil temperature in said transmission.

5. The method of claim 1 wherein said first pressure is equal to a maximum operating pressure for said outer chamber.

6. The method of claim 1 wherein said first pressure is at least 50% greater than said third pressure.

7. The method of claim 1 wherein said first pressure is at least twice said third pressure.

8. The method of claim 1 wherein said first pressure is at least triple said third pressure.

9. The method of claim 1 further comprising comparing said function of said engine speed with a threshold value and maintaining said first pressure at said first level if said function is greater than said threshold value.

10. The method of claim 1 further comprising comparing said function of said engine speed with a threshold value and increasing said first pressure to said second level if said function is less than or equal to said threshold value.

11. The method of claim 1 further comprising comparing said engine speed to a launch threshold value and if said engine speed is greater than said launch threshold value bypassing said function of engine speed to decrease said third level to said fourth level.

12. The method of claim 1 wherein said vehicle comprises a valve controlling hydraulic pressure in said outer chamber and wherein a zero percent duty cycle fully opens said valve; and said method further comprising comparing said engine speed to a launch threshold value and, when said engine speed is greater than said launch threshold value, applying said zero percent duty cycle to said valve.

13. The method of claim 1 wherein said vehicle comprises a valve controlling hydraulic pressure in said outer chamber and wherein a duty cycle controls an operating position for said valve; and said method further comprising comparing said engine speed to a launch threshold value and, when said engine speed is less than or equal to said launch threshold value, determining said duty cycle as a function of said engine speed and applying said duty cycle to said valve.

14. The method of claim 13 wherein said vehicle comprises a transmission; and said method further comprising modifying said duty cycle as a function of oil temperature in said transmission.

15. The method of claim 1 wherein said torque converter comprises a cover, an output hub, and a torque converter clutch, said torque converter clutch providing a torque transmission path between said cover and said output hub.

16. The method of claim 1 further comprising maintaining said engine speed below a predetermined level.

17. The method of claim 1 further comprising determining an optimal engine speed to provide a peak torque for a determined throttle position and fully engaging said clutch when said engine reaches said optimal engine speed.

18. A method of operating a clutch during a vehicle launch comprising the steps of:

comparing speed for an engine in said vehicle to a launch threshold value;

if said engine speed is less than said launch threshold value, increasing a first hydraulic pressure in an inner chamber from a first level to a second level, wherein said first hydraulic pressure urges, to an engaged position, a clutch disposed between an engine in said vehicle and an impeller for a torque converter in said vehicle;

if said engine speed is less than said launch threshold value, decreasing a second hydraulic pressure in an outer chamber from a third level to a fourth level as a function of said engine speed and a throttle position for said vehicle, wherein said second hydraulic pressure opposes said first hydraulic pressure; and, slipping said clutch in response to decreasing said second pressure.

19. A method of operating a clutch during a vehicle launch comprising the steps of:

decreasing a first hydraulic pressure in an outer chamber from a first level to a second level as a function of engine speed and throttle position for said vehicle, wherein said first hydraulic pressure urges, to a closed position, a clutch disposed between an engine in said vehicle and an impeller for a torque converter in said vehicle;

comparing said function to a threshold value;

if said function is less than said threshold, increasing a second hydraulic pressure in an inner chamber from a third level to a fourth level, wherein said second hydraulic pressure opposes said first pressure; and, slipping said clutch in response to decreasing said first pressure.

* * * * *